(12) United States Patent
Liu et al.

(10) Patent No.: US 10,979,624 B2
(45) Date of Patent: Apr. 13, 2021

(54) METHODS AND DEVICES FOR ESTABLISHING PHOTOGRAPHING TEMPLATE DATABASE AND PROVIDING PHOTOGRAPHING RECOMMENDATION INFORMATION

(71) Applicant: ALIBABA GROUP HOLDING LIMITED, Grand Cayman (KY)

(72) Inventors: Shuyan Liu, Zhejiang (CN); Di Wu, Zhejiang (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 926 days.

(21) Appl. No.: 15/484,042

(22) Filed: Apr. 10, 2017

(65) Prior Publication Data
US 2017/0223265 A1 Aug. 3, 2017

Related U.S. Application Data

(63) Continuation of application No. PCT/CN2015/091229, filed on Sep. 30, 2015.

(30) Foreign Application Priority Data

Oct. 10, 2014 (CN) .......................... 201410533016.9

(51) Int. Cl.
*G06F 16/00* (2019.01)
*H04N 5/232* (2006.01)
(Continued)

(52) U.S. Cl.
CPC ......... *H04N 5/23222* (2013.01); *G06F 16/51* (2019.01); *G06F 16/5838* (2019.01);
(Continued)

(58) Field of Classification Search
CPC ............ H04N 5/23222; H04N 5/23219; G06F 16/51; G06F 16/5838; G06F 16/5866;
(Continued)

(56) References Cited

U.S. PATENT DOCUMENTS 8,208,764 B2 * 6/2012 Guckenberger ...... G06F 16/583
382/305
2003/0126121 A1 * 7/2003 Khan ....................... G06K 9/00
(Continued)

FOREIGN PATENT DOCUMENTS

CN       103297697 A      9/2013
CN       103413270 A     11/2013
(Continued)

OTHER PUBLICATIONS

PCT International Search Report and Written Opinion dated Jan. 4, 2016, issued in corresponding International Application No. PCT/CN2015/091229 (15 pgs.).
(Continued)

*Primary Examiner* — Cheryl Lewis
(74) *Attorney, Agent, or Firm* — Finnegan, Henderson, Farabow, Garrett & Dunner, LLP

(57) ABSTRACT

Embodiments of the disclosure provide methods and devices for establishing a photographing template database and providing photographing recommendation information. The method includes: acquiring a number of subject characters and/or gender information; sending a request for acquiring a photographing template to a server, the request carrying the number of subject characters and/or gender information, so that the server performs a matching operation on the number of subject characters and/or gender information and description information of each photographing templates in a template database to acquire a matched target photographing template, wherein the template database contains a plurality
(Continued)

of photographing templates and corresponding description information, and the description information of the photographing templates and the photographing templates contain a corresponds to number of characters and/or gender information; and providing photographing recommendation information to a user, according to the matched target photographing template returned by the server.

32 Claims, 6 Drawing Sheets

(51) Int. Cl.
  *G06F 16/51*   (2019.01)
  *G06F 16/583*   (2019.01)
  *G06F 16/58*   (2019.01)
  *G06K 9/00*   (2006.01)
  *G06K 9/78*   (2006.01)

(52) U.S. Cl.
  CPC ..... *G06F 16/5866* (2019.01); *H04N 5/23219* (2013.01); *G06K 9/00288* (2013.01); *G06K 9/00362* (2013.01); *G06K 9/78* (2013.01)

(58) Field of Classification Search
  CPC ... G06K 9/00362; G06K 9/00288; G06K 9/78
  See application file for complete search history.

(56) References Cited

U.S. PATENT DOCUMENTS

| | | | |
|---|---|---|---|
| 2004/0218058 A1* | 11/2004 | Yamaguchi | H04N 1/00342 348/218.1 |
| 2010/0214442 A1 | 8/2010 | Uemura et al. | |
| 2011/0052086 A1* | 3/2011 | Tobita | H04N 9/8205 382/224 |
| 2012/0210200 A1* | 8/2012 | Berger | G06F 3/0481 715/202 |
| 2012/0328169 A1* | 12/2012 | Heeter | G06Q 30/0621 382/118 |
| 2013/0314566 A1* | 11/2013 | Walker | H04N 5/232 348/231.3 |
| 2015/0139552 A1* | 5/2015 | Xiao | G06K 9/46 382/195 |
| 2016/0005171 A1* | 1/2016 | Watanabe | G06K 9/00677 382/118 |

FOREIGN PATENT DOCUMENTS

| | | |
|---|---|---|
| CN | 103577788 A | 2/2014 |
| CN | 103605687 A | 2/2014 |
| WO | WO 2016/054989 A1 | 4/2016 |

OTHER PUBLICATIONS

First Chinese Office Action issued in Chinese Application No. 201410533016.9 dated Jun. 5, 2018 (24 pgs).

* cited by examiner

METHODS AND DEVICES FOR ESTABLISHING PHOTOGRAPHING TEMPLATE DATABASE AND PROVIDING PHOTOGRAPHING RECOMMENDATION INFORMATION

CROSS REFERENCE TO RELATED APPLICATION

The disclosure claims the benefits of priority to International Application No. PCT/CN2015/091229, filed Sep. 30, 2015, which claims the benefits of priority to Chinese Application No. 201410533016.9, filed Oct. 10, 2014, both of which are incorporated herein by reference in their entireties.

TECHNICAL FIELD

The present disclosure relates to the technical field of photographing, and in particular to methods and devices for establishing a photographing template database and providing photographing recommendation information.

BACKGROUND

With the development of terminal device technologies, various terminal devices with photographing functions (including digital cameras, mobile phones, tablet computers, and the like) are more and more popular, and people can take photos anytime and anywhere.

In order to make photos with better effects, some tools for beautifying photos are provided. The tools mainly modify the face form, skin and the like of a person in a photo, so that the person in the photo look more beautiful. However, the photographing effect also relates to the gesture of the captured person, the photographing angle, and the like. Upon taking a group photo, the positioning, gesture, and the like of each person also directly affect the photographing effect. For example, when some young people take a group photo together, creativity is very important to make the characters in the photo look energetic. However, in fact, people usually lack creativity when there is a need, and may only stand in one or several rows regularly and make simple usual gestures, making the photo look dull and lack of vitality.

Therefore, in the case of taking a group photo, how to further beautify the characters in the photo is a technical problem urgent to be solved.

SUMMARY

Embodiments of the disclosure provide a method for establishing a photographing template database, comprising: acquiring, as a photographing template, a picture according to a preset feature at least including character feature information of at least two characters contained in the picture; acquiring description information of the photographing template according to a number of characters and/or gender information contained in the photographing template; and storing a corresponding relationship between the photographing template and the description information into the photographing template database, so that when a search request for acquiring the photographing template is received, a matching operation is performed on the description information of the photographing template according to a parameter carried in the search request and a matched photographing template is returned Embodiments of the disclosure further provide a method for providing photographing recommendation information, comprising: acquiring a number of subject characters and/or gender information; sending a request for acquiring a photographing template to a server, the request carrying the number of subject characters and/or gender information, so that the server performs a matching operation on the number of subject characters and/or gender information and description information of each photographing template in a template database to acquire a matched target photographing template, wherein the template database contains a plurality of photographing templates and corresponding description information, and the description information of the photographing templates and the photographing templates contain a number of characters and/or gender information; and providing photographing recommendation information according to the matched target photographing template returned by the server.

Embodiments of the disclosure further provide a method for providing photographing recommendation information, wherein a template database storing a plurality of photographing templates and corresponding description information is provided, the description information of the photographing template is associated with a number of characters and/or gender information contained in the photographing template, and the method comprises: receiving a search request sent by a client terminal for acquiring the photographing templates, the request carrying a number of subject characters and/or gender information; performing a matching operation on the number of subject characters and/or gender information and the description information of each of the photographing templates in the template database; and returning a matched target photographing template to the client terminal so that the client terminal provides photographing recommendation information according to the target photographing template.

Embodiments of the disclosure further provide a device for establishing a photographing template database, comprising: a photographing template acquiring unit used for acquiring, as a photographing template, a picture according to a preset feature at least including character feature information of at least two characters contained in the picture; a description information acquiring unit used for acquiring description information of the photographing template according to number of characters and/or gender information contained in the photographing template; and a corresponding relationship storing unit used for storing a corresponding relationship between the photographing template and the description information into the photographing template database, so that when a search request for acquiring a photographing template is received, a matching operation is performed on the description information of the photographing template according to a parameter carried in the search request and a matched photographing template is returned.

Embodiments of the disclosure further provide a device for providing photographing recommendation information, comprising: a subject character information acquiring unit used for acquiring a number of subject characters and/or gender information; a request sending unit used for sending a request for acquiring a photographing template to a server, the request carrying the number of subject characters and/or gender information, so that the server performs a matching operation on the number of subject characters and/or gender information and description information of each photographing template in a template database to acquire a matched target photographing template, wherein the template database stores a plurality of photographing templates and corresponding description information, and the description information of the photographing templates and the photographing template contain number of characters and/or gender information; and a recommendation information providing unit used for providing photographing recommendation information according to the matched target photographing template returned by the server.

Embodiments of the disclosure further provide a device for providing photographing recommendation information, wherein a template database storing a plurality of photographing templates and corresponding description information is provided, the description information of the photographing template is associated with a number of characters and/or gender information contained in the photographing template, and the device comprises: a request receiving unit used for receiving a search request sent by a client terminal for acquiring a photographing template, the request carrying a number of subject characters and/or gender information; a matching operation unit used for performing a matching operation on the number of subject characters and/or gender information and the description information of each of the photographing templates in the template database; and a template returning unit used for returning a matched target photographing template to the client terminal so that the client terminal provides photographing recommendation information according to the target photographing template.

In the embodiments of the present disclosure, a photographing template database may be established in advance for taking a group photo. The database stores a plurality of photographing templates respectively corresponding to different numbers of people, genders, and the like. For example, the database may include a photographing template for taking a group photo of three girls, a photographing template for taking a group photo of two boys, and the like. Therefore, upon taking a group photo, a proper photographing template may be selected according to the number, gender, and the like of persons taking a group photo, and then a photo can be taken with reference to the positioning, angle and the like in the template, by which photographing effects may be improved.

BRIEF DESCRIPTION OF THE DRAWINGS

In order to illustrate the technical solution in the embodiments of the present disclosure, the accompanying drawings to be used in the embodiments will be introduced briefly hereinafter. Obviously, the drawings described below are merely some embodiments of the present disclosure, and it is appreciated that other drawings according to these drawings may be obtained without any inventive efforts.

DETAILED DESCRIPTION

The technical solution in the embodiments of the present disclosure will be described clearly and completely in conjunction with the drawings in the embodiments of the present disclosure hereinafter. It is appreciated that the described embodiments are merely some embodiments of the present disclosure, not all embodiments. All other embodiments obtained based on the embodiments of the present disclosure fall within the scope of the present disclosure.

According to some embodiments of the present disclosure, a photographing template database may be established in advance for taking a group photo. The database stores a plurality of photographing templates respectively corresponding to different numbers of people, genders, and the like. For example, the database may include a photographing template for taking a group photo of three girls, a photographing template for taking a group photo of two boys, and the like. Therefore, upon taking a group photo, a proper photographing template may be selected according to the number, gender, and the like of persons taking a group photo, and then a photo can be taken with reference to the positioning, angle and the like in the template, by which photographing effects may be improved. Embodiments will be described in detail hereinafter.

Embodiment I

Figure 1:
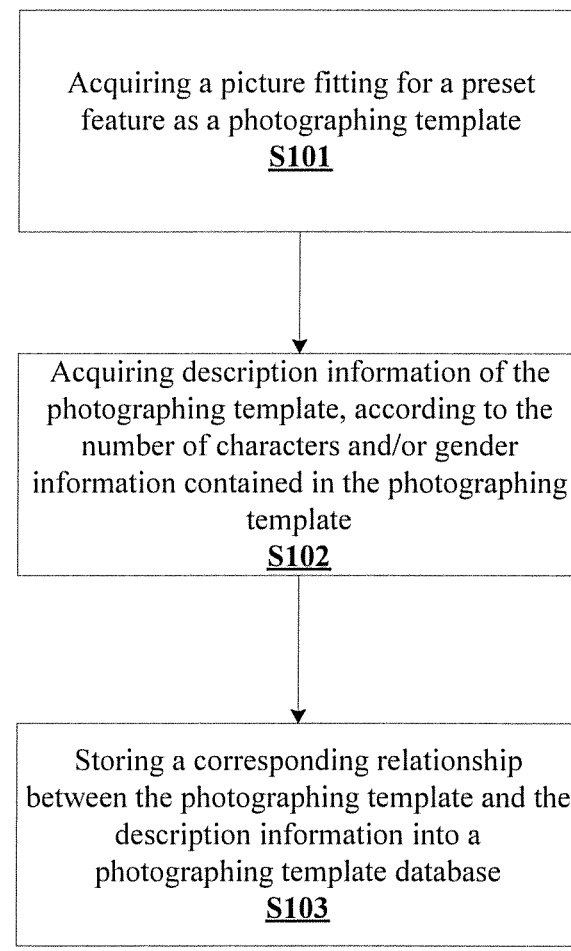
FIG. 1 is a flowchart of a method for establishing a photographing template database, provided according to embodiments of the present disclosure.

In Embodiment I, a method for establishing a photographing template database is provided first. Referring to FIG. 1, the method may include the following steps.

S101: a picture fitting for a preset feature may be acquired as a photographing template. The preset feature at least includes character feature information of at least two characters contained in the picture.

The photographing template is used to provide a reference while taking a group photo. Therefore, upon acquiring such a picture that may be used as a photographing template, one of the features for the picture is the picture should include at least two characters, as the picture is called as a group photo. In some embodiments, not all pictures that contain two characters can be used as photographing templates. For example, in some pictures, characters may occupy a small portion of a picture. Therefore, upon selecting a photographing template, in addition to at least two characters being contained in the picture, background information in the picture (for example, pictures with very complex background are usually not suitable as photographing templates), character feature profile sharpness (if the character feature profile is too blurry, then it may be difficult to discern the gesture of the character), position and proportion of character feature in the picture, and the like may also be taken into account. One or more of these pieces of information may be added into preset features. Only pictures fitting for these features can be used as photographing templates.

There may be a plurality of sources for acquiring a picture that can be used as a photographing template. For example, in one of the embodiments, the picture may be extracted from some picture databases. For example, some pictures regarding a group photo may be searched out from the massive pictures contained in a picture library of a search engine. And the pictures may be analyzed according to the above preset features, so as to screen out pictures that can be used as photographing templates. In another example, a database of an e-commerce transaction platform also contains massive pictures and may also contain some pictures of group photos. For example, when his-and-hers clothes are displayed, some merchants may invite two models to put on these his-and-hers clothes to take photos and upload the pictures to a server of the transaction platform for a user to view. Correspondingly, the database of the transaction platform will then save these pictures. There are many similar conditions. Thus, pictures regarding group photos may be searched out from massive picture libraries of such a server of the transaction platform, and then may be analyzed according to the above preset features, so as to screen out pictures that can be used as photographing template.

In some embodiments of the present disclosure, in additional to searching pictures that can be used as photographing templates from some existing picture libraries, an operation interface for uploading a photographing template may be provided for users. For example, in some website interfaces or application interfaces, a button for uploading a photographing template may be provided for a user. Therefore, when the user has taken a group photo with good effects or acquired some group photos with good effects in other manners, the photos may be uploaded via this operation interface, so that a photographing template for taking a group photo may be collected from the users.

S102: description information of the photographing template may be acquired according to the number of characters and/or gender information contained in the photographing template.

After a picture that can be used as a photographing template has been acquired, the number of characters and/or gender information contained in various photographing template pictures may also be acquired and used as description information of the photographing template. Then, a user may be provided with a photographing template for reference, according to the description information.

There may be a plurality of methods for acquiring the number of characters and/or gender information contained in various photographing template pictures. For example, image analysis may be performed on each picture for face recognition. Moreover, gender feature recognition may also be performed. The number of characters and/or gender information contained in various photographing template pictures may be determined by above-mentioned recognition technologies. Or, in the above case where a user uploads a photographing template, another operation interface (such as an input box, a select box, and the like) may be further provided for the user, so that the user can provide the number of characters and/or gender information contained in a photographing template while uploading the photographing template. Thus, the number of characters and/or gender information contained in the photographing template may be acquired according to the information uploaded by the user and used as the description information of the photographing template.

S103: a corresponding relationship between the photographing template and the description information may be stored into a photographing template database, so that when a search request for acquiring a photographing template is received, a matching operation is performed on the description information of the photographing template according to a parameter carried in the search request, and a matched photographing template is returned.

After the description information of the photographing template is acquired, the corresponding relationship between the photographing template and the description information may be stored in the photographing template database. For example, the results of the photographing template database may be shown as in the following Table 1.

TABLE 1

| Template number | Template data | Description information |
| --- | --- | --- |
| Template__001 | Data 1 | Three girls |
| Template__002 | Data 2 | Two boys |
| Template__003 | Data 3 | Three boys and two girls |
| Template__004 | Data 4 | Two boys and two girls |
| . . . | . . . | . . . |

Therefore, when the user needs a photographing template to be provided, the number of characters, gender information and the like may be acquired first, and then the matching operation is performed on the acquired information and the description information of each photographing template. Thus, successfully matched photographing templates can be provided for the user, and the user may choose a position or select a photographing angle and the like with reference to the photographing templates.

In order to highlight the character feature in the photographing template, for example, during storing various template pictures in the template database, a body profile curve of each character may be extracted from the template picture and stored in the template database. The body profile curve is a profile curve generated according to the gesture of the character in the template.

Therefore, upon storing a template picture and corresponding description information into template data, the character feature profile curve in the template may be recognized first to determine the corresponding position of the character feature profile curve in the picture, and the corresponding position information may be stored in the template database. The storing structure of the template data in the database may be shown as in Table 2.

TABLE 2

| Template number | Template data | Description information | Body profile curve |
| --- | --- | --- | --- |
| Template__001 | Picture 1 | Three girls | Body profile curve information of each character |
| Template__002 | Picture 2 | Two boys | Body profile curve information of each character |
| Template__003 | Picture 3 | Three boys and two girls | Body profile curve information of each character |
| Template__004 | Picture 4 | Two boys and two girls | Body profile curve information of each character |
| . . . | . . . | . . . | . . . |

There may be several methods for storing body profile curve information in the template database. For example, after a body profile curve has been extracted, the coordinates of each pixel point on this curve may be determined to describe this curve. Or, this curve may also be described with functions, vectors, and the like.

After a certain template picture has been selected at a client terminal as a reference, an image capture device of a terminal device may be initialized and an image layer is created on an upper layer of the captured image. On the image layer, the curve described in Table 2 is shown in a certain color (such as black, red, blue, and the like) and the other positions are transparent. Therefore, the user can view the body profile curve of each character on the upper layer of the photographed image picture, while other image contents will not be shielded. The body profile curve displayed on the interface can be matched by continuously adjusting the gesture of the subject person, the photographing angle, and the like until the character in the view finder fits for the body profile curve shown in the interface. It indicates that the user makes the gesture of the character feature in the template, and better photographing effects may be obtained.

In addition, in order to better determine the position of each body part during photographing, the position of the photographed body part may be marked on the body profile curve upon displaying the body profile curve of the character feature on the upper layer of the image picture. For example, "face vertex," "left shoulder position," "chest position," "most raised hip position," "right hand position," and the like may be marked, so as to more intuitively guide the adjustment of a subject character. In practice, the position of a key body part in the character feature in each template picture may further be analyzed and stored in the template database. Therefore, the database may further store the name of each key body part and corresponding coordinates in addition to saving body profile curve information. For example, the storing structure may be shown as in Table 3.

data from the server to provide recommendation information to the user. The implementation of this application will be described hereinafter.

Embodiment II

Figure 2:
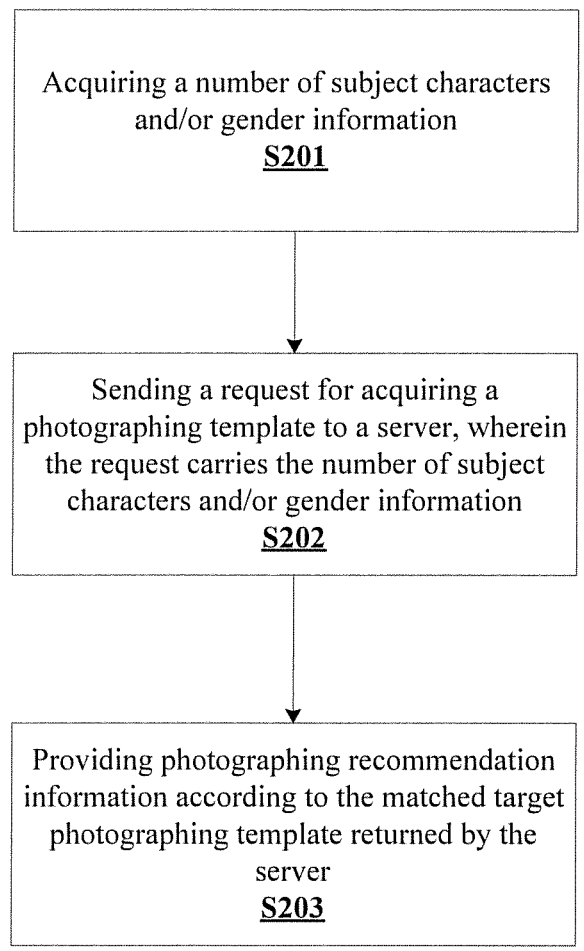
FIG. 2 is a flowchart of a method for providing photographing recommendation information, provided according to embodiments of the present disclosure.

Embodiment II provides a method for providing photographing recommendation information mainly from the perspective of a client terminal. A template database is provided at a server. The template database stores a plurality of photographing templates and corresponding description information. The description information of the photographing template is associated with the number of characters and/or gender information contained in the photographing template. Referring to FIG. 2, the method comprises the following steps.

In S201, a number of subject characters and/or gender information may be acquired.

During practical application, there may be a plurality of implementations for acquiring the number of subject characters and/or gender information. For example, in an implementation mode, a photographing operation interface may be provided to a user on a client terminal interface of an application, and the user can submit a photographing request

TABLE 3

| Template number | Template data | Description information | Body profile curve | Key body part relative position |
|---|---|---|---|---|
| Template_001 | Picture 1 | Three girls | Body profile curve information of each character | Relative position information of a key body part on each character body profile curve |
| Template_002 | Picture 2 | Two boys | Body profile curve information of each character | Relative position information of a key body part on each character body profile curve |
| Template_003 | Picture 3 | Three boys and two girls | Body profile curve information of each character | Relative position information of a key body part on each character body profile curve |
| Template_004 | Picture 4 | Two boys and two girls | Body profile curve information of each character | Relative position information of a key body part on each character body profile curve |
| ... | ... | ... | ... | ... |

Upon displaying the body profile curve, the name of each body part and the corresponding position information may be read from the curve. And the name of a specific key body part and the corresponding position information may be marked on the body profile curve, so that the user may more intuitively determine how to place each body part to better fit for the gesture of the model character in the template.

The above Embodiment I introduces a method for establishing a photographing template database. In actual application, the database may be created by means of manual collection, marking, and the like. Anyway, after such a photographing template database is created, if a group photo is to be taken, this database can be used to provide recommendation information about positioning, angle, and the like to a user for photographing, so as to help the user take a group photo with better effects. When the user is provided with recommendation information by this database, an application may be provided to the user. The application may include a client terminal program and a server program. The photographing template database is mainly stored at the server, and the client terminal program is used to interact with the user. After receiving a photographing request from the user, the client terminal may request relevant template through the interface. Meanwhile, another operation interface may be provided in the interface, so that the user can submit the number of subject characters and/or gender information before or after or upon submitting the photographing request. For example, if there are three girls taking a group photo, this information can be submitted to the client terminal of the application through this operation interface. Therefore, the client terminal may acquire the number of subject characters and/or gender information.

Or, in another method, a user may be provided with a photographing operation interface only on a client terminal interface of the application. After the user initiates a photographing request through this operation interface, the client terminal may first turn on an image capture device by invoking a preset interface, so that a view finder of the image capture device may capture an image. Then, the client terminal may perform face recognition on the scene captured in the view finder and determine the number of subject characters and/or gender information according to the number of faces and gender feature recognized. That is, in this method, the client terminal may automatically recognize the number, gender and other information of characters for taking a group photo, without manual input of the user. It should be noted that face recognition technologies, gender recognition technologies, and the like may include the implementations in the prior art, description of which will be omitted herein.

In S202, a request for acquiring a photographing template may be sent to a server, so that the server performs a matching operation on the number of subject characters and/or gender information and description information of each photographing template in a template database to acquire a matched target photographing template. The request carries the number of subject characters and/or gender information, and the template database stores a plurality of photographing templates and corresponding description information. And the description information of the photographing template and the photographing template contain number of characters and/or gender information.

After the number, gender and other information of persons for taking a group photo have been determined, a request for acquiring a photographing template may be sent to the server, and the request may carry the above number, gender and other information of persons for taking a group photo. Therefore, the server may parse the number, gender and other information of persons for taking a group photo from the request, and perform a matching operation on the parsed information and the description information of each photographing template. If one or some photographing templates are matched successfully, then these successfully matched photographing templates may be returned to the client terminal.

In S203, photographing recommendation information may be provided according to the matched target photographing template returned by the server.

After receiving the photographing template returned by the server, it can be displayed to the user as a reference during photographing. The server may return a plurality of matched photographing templates, and then all these photographing templates may be provided to the user for selection, and the user may select one favorite as the reference. In addition, in another embodiment, the client terminal may also upload the selections of the user to the server and the server may also make statistics on the selections. For example, the number of times that each photographing template corresponding to certain description information is selected by the user may be counted, so that recommendation can be made according to the number of times that each template is selected by the user, upon providing other users with a photographing template corresponding to the description information. For example, a template is selected from templates that have been selected many times, and then may be provided to the user. Or, the matched photographing templates can be ordered according to times of being selected, and then an ordered template list is provided to the user for selection.

After a certain photographing template for use is selected finally, each person taking a group photo can choose positions according to the position, gesture, and the like of each character in the photographing template, and the photographer may also adjust the photographing angle to make them fit for the photographing template as much as possible, and finally better photographing effect can be obtained.

Furthermore, the photographing template database may also store body profile curve information of each character in the photographing template, and the server may also return the body profile curve information of each character in the photographing template while returning a matched photographing template. After a final photographing template is selected, the client terminal may first initialize an image capture device by invoking a preset interface, and may provide a body profile curve graph of each character feature in the target photographing template on an upper layer of an image interface captured by the image capture device, so as to adjust photographing according to the body profile curve graph. When the body profile curve is displayed on the image interface captured by the image capture device, an image layer may be created on the upper layer of the image interface. On the image layer, the body profile curve of each character is shown in a certain color (such as black, red, and the like). And the other positions may be transparent or semi-transparent, so that the photographer can view the body profile curve of each character on the upper layer of the image picture, while no other image contents will be shielded. Therefore, if the subject person takes a selfie, this body profile curve can be directly viewed on the screen of the terminal device, and then he/she can adjust his/her position, gesture, and the like according to the curve. If the photographer takes a photo for someone else, then he/she can guide the position, gesture, and the like of the subject person according to the body profile curve displayed on the screen.

Furthermore, the photographing template database may further store relative position information of the key body part of each character in the photographing template, and the server may also return relative position information of the key body part of each character in the photographing template while returning a matched photographing template. Therefore, when the above body profile curve is displayed on the client terminal, the client terminal may also provide the name of each key body part of each character and the corresponding position information on the upper layer of the image interface according to the relative position information. Then the position, gesture, and the like of the subject person may be adjusted more intuitively.

By means of the above methods, the position, gesture and the like for taking a group photo can be guided, so as to generate a group photo with better effects. In order to further optimize the photographing effects, in some embodiments, face recognition may be performed on the scene captured in the view finder of the image capture device. A face region will be recognized for each character, and the size of the face form of the subject character may be determined according to the area of the face region, and then the proportion of the face form of each character can be determined. In addition, the body (including height and the like) proportion and the like of each character may also be determined according to the distance from the vertex of each face region to the bottom in the vertical direction of the view finder. Then, the character image captured in the view finder of the image capture device may be filtered according to the proportion for adjusting the face form and/or body proportion of each character in the photographed picture. For example, if the face form of a certain character is relatively big, then a filter function may be applied to the head region of the character to size down the head and thus size down his/her face form. In the final picture, the face form of this character will not be too big relative to the face forms of other characters and the overall effect is relatively harmonious. Or, if the height of a certain character is high or short relative to other characters, then a filter function may be applied to the leg region of the character so that the legs are shortened or lengthened, and the body proportion of each character in the final photo is harmonious. It should be noted that, during actual applications, general filter functions may be used, and the filter functions can be invoked by using the position information of this region in the image, adjustment proportion, and other information as parameters after a specific region to be processed is determined.

Embodiment III

Figure 3:
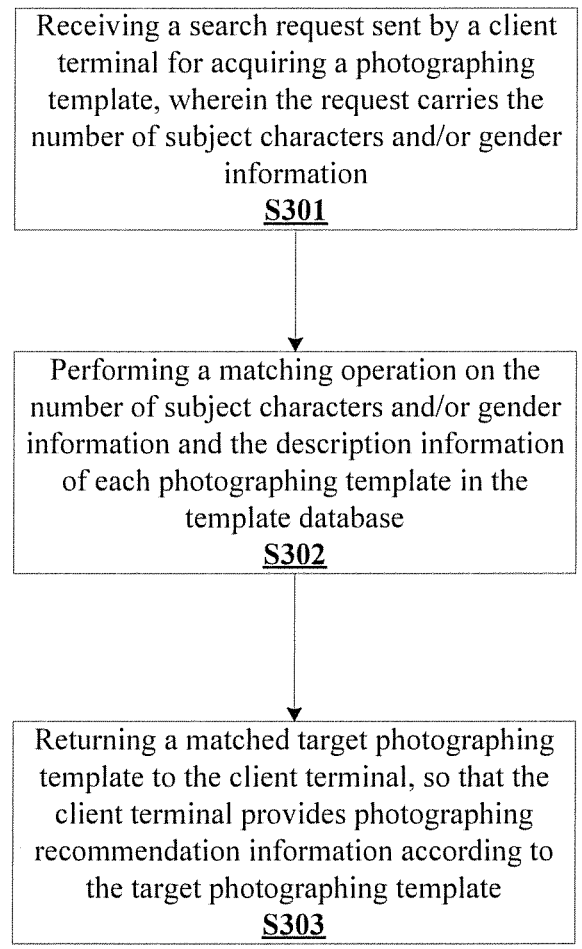
FIG. 3 is a flowchart of another method for providing photographing recommendation information, provided according to embodiments of the present disclosure.

Embodiment III provides a method for providing photographing recommendation information mainly from the perspective of a server. A template database is provided at the server. The template database stores a plurality of photographing templates and corresponding description information. The description information of the photographing template is associated with number of characters and/or gender information contained in the photographing template. Referring to FIG. 3, the method may comprise the following steps.

In S301, a search request sent by a client terminal for acquiring a photographing template may be received, the request may carry the number of subject characters and/or gender information.

In S302, a matching operation may be performed on the number of subject characters and/or gender information and the description information of each photographing template in the template database.

In S303, a matched target photographing template may be returned to the client terminal, so that the client terminal provides photographing recommendation information according to the target photographing template.

If there are a plurality of matched target photographing templates and the server stores statistical information such as the times that the photographing template has been selected by the users, then one or more photographing templates that have been selected the most may be returned according to this statistical information. Or, each matched template is ordered according to the times being selected, and then may be returned to the client terminal.

Furthermore, the template database may further store body profile curve information of the character feature contained in the photographing template, and return the information to the client terminal, so that the client terminal may also provide the body profile curve information to the user for adjusting his/her gesture while providing photographing recommendation information.

Furthermore, the template database may also store the name and coordinates of each key body part of character features contained in the photographing template, and return the same to the client terminal. When the body profile curve is displayed on the client terminal, the client terminal may read the name of each key body part on the curve and the corresponding position coordinates from the database. The name of specific key body part and the corresponding position may be marked on the body profile curve, so that the user may more intuitively determine how to place each body part to better fit for the character feature in the template.

Embodiment III corresponds to Embodiment II, and the difference merely lies between the description perspectives. The details may refer to Embodiment II, and the description of which will be omitted herein.

In summary, according to the embodiments of the present disclosure, a photographing template database may be established in advance for taking a group photo. The photographing template database stores a plurality of photographing templates respectively corresponding to different numbers of persons, gender, and the like. For example, the photographing template database may include a photographing template for taking a group photo of three girls, a photographing template for taking a group photo of two boys, and the like. Therefore, upon taking a group photo, a proper photographing template may be selected according to the number and gender of persons, and then a photo can be taken with reference to the positions, angle, and the like in the template. Photographing effects may be improved.

Figure 4:
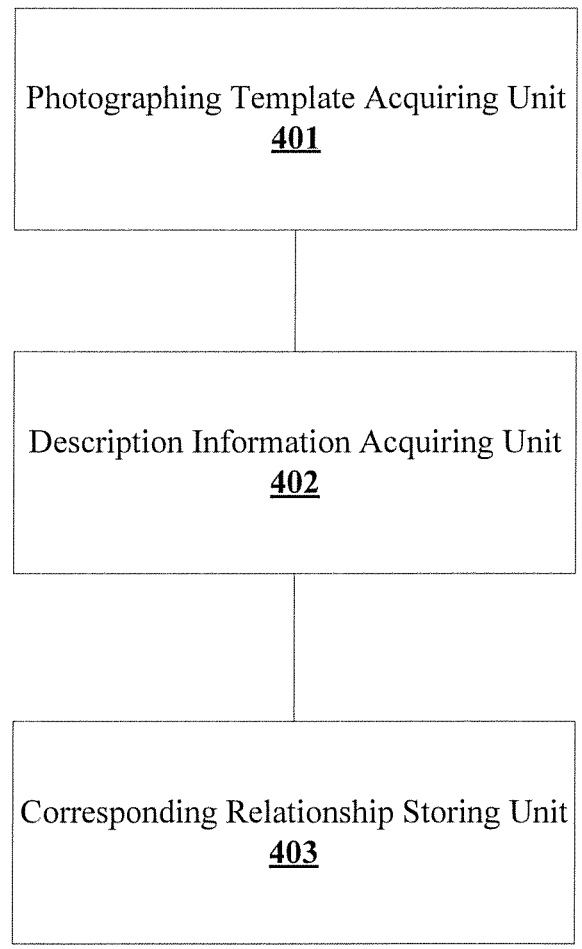
FIG. 4 is a schematic diagram of a first device, provided according to embodiments of the present disclosure.

Some embodiments of the present disclosure also provide a device for establishing a photographing template database corresponding to the method for establishing a photographing template database provided according to Embodiment I of the present disclosure. Referring to FIG. 4, the device may include a photographing template acquiring unit 401, a description information acquiring unit 402, and a corresponding relationship storing unit 403.

Photographing template acquiring unit 401 may be used for acquiring, as a photographing template, a picture fitting for a preset feature. The preset feature at least includes character feature information of at least two characters contained in the picture.

Description information acquiring unit 402 may be used for acquiring description information of the photographing template according to the number of characters and/or gender information contained in the photographing template.

Corresponding relationship storing unit 403 may be used for storing the corresponding relationship between the photographing template and the description information into a photographing template database, so that when a search request for acquiring a photographing template is received, a matching operation is performed on the description information of the photographing template according to a parameter carried in the search request, and a matched photographing template may be returned.

The preset feature may further include one or more of: background information, character feature profile sharpness, and position and proportion of character feature in the picture.

In some embodiments, the device may further include:
a curve recognition unit used for recognizing a character feature profile curve in the photographing template;
a position information determining unit used for determining position information of the character feature profile curve in the photographing template; and
a curve information storing unit used for storing the position information corresponding to the character feature profile curve in the template database, so that when a matched target photographing template is returned, the position information corresponding to the character feature profile curve is also returned.

Moreover, the device may further include:
a body part position information determining unit used for determining the name of each body part of the character feature and corresponding position information in the photographing template; and
a body part position information storing unit used for determining the name of the body part and the corresponding position information in the template database, so that when a matched target photographing template is returned, the name of the body part and the corresponding position information are also returned.

Figure 5:
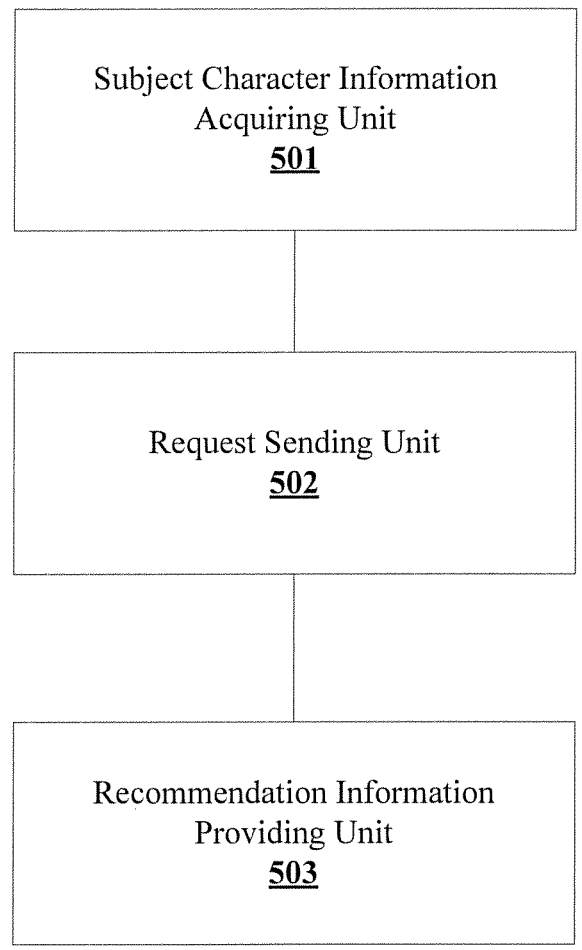
FIG. 5 is a schematic diagram of a second device, provided according to embodiments of the present disclosure.

Some embodiments of the present disclosure also provide a device for providing photographing recommendation information corresponding to the method for providing photographing recommendation information provided according to Embodiment II of the present disclosure. Referring to FIG. 5, the device may particularly include: a subject character information acquiring unit 501, a request sending unit 502, and a recommendation information providing unit 503.

Subject character information acquiring unit 501 may be used for acquiring the number of subject characters and/or gender information.

Request sending unit 502 may be used for sending to a server a request for acquiring a photographing template, so that the server performs a matching operation on the number of subject characters and/or gender information and description information of each photographing template in a template database to acquire a matched target photographing template, wherein the request may carry the number of subject characters and/or gender information, and the template database may store a plurality of photographing templates and corresponding description information. The description information of the photographing template and the photographing template contain number of characters and/or gender information.

Recommendation information providing unit 503 may be used for providing photographing recommendation information according to the matched target photographing template returned by the server.

In one embodiment, the subject character information acquiring unit 501 may be further used for determining the number of subject characters and/or gender information according to information input by a user.

In another embodiment, the subject character information acquiring unit 501 may include:

an image capture device initializing sub-unit used for initializing an image capture device by invoking a preset interface; and a recognizing sub-unit used for performing face recognition on a scene captured in a view finder of the image capture device and determining the number of subject characters and/or gender information according to the recognized number of faces and gender feature.

The template database further stores position information corresponding to a character feature profile curve in the photographing template, so that the server also returns the position information corresponding to the character feature profile curve while returning a matched target photographing template, the device may further comprise:

an image capture device initializing unit used for initializing an image capture device by invoking a preset interface; and a body profile curve providing unit used for providing a body profile curve graph of each character feature in the target photographing template on an upper layer of an image interface captured by the image capture device to adjust photographing according to the body profile curve graph.

The template database may further store the name of each body part of the character feature and the corresponding position information, so that the server also returns the name of each body part of the character feature and the corresponding position information while returning a matched target photographing template, therefore the device may further include:

a body part position information providing unit used for providing the name of the body part and the corresponding position information on an upper layer of the image interface.

In addition, in order to further obtain better photographing effect, the device may further include:

an image capture device initializing unit used for initializing an image capture device by invoking a preset interface; and a recognizing unit used for performing face recognition on a scene captured in a view finder of the image capture device;

a proportion information determining unit used for determining the face form and/or body proportion of each subject character according to the face recognition result; and a filtering unit used for filtering the character image captured in the view finder of the image capture device according to the proportion for adjusting the face form and/or body proportion of each character in the photographed picture.

Moreover, the device may further include:

a template identification information uploading unit used for, upon the server returning a plurality of matched target photographing templates, uploading identification information of a target photographing template finally selected by the user to the server, so that the server makes statistics on the times that each photographing template has been selected by the user and returns a matched target photographing template according to the statistical result.

Figure 6:
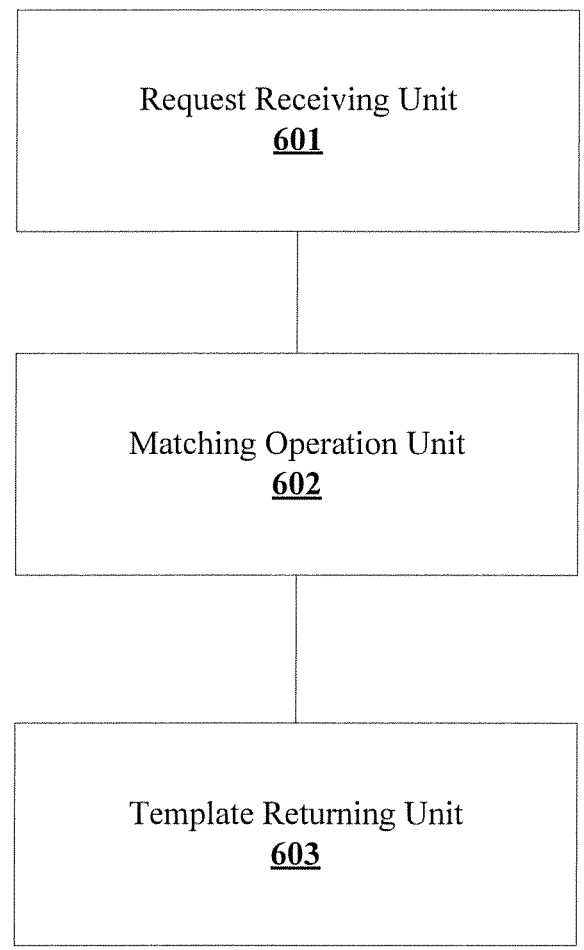
FIG. 6 is a schematic diagram of a third device, provided according to embodiments of the present disclosure.

Embodiments of the present disclosure further provide a device for providing photographing recommendation information corresponding to the method for providing photographing recommendation information provided according to Embodiment III of the present disclosure, wherein a template database is provided at a server, storing a plurality of photographing templates and corresponding description information. The description information of the photographing template is associated with number of characters and/or gender information contained in the photographing template. Referring to FIG. 6, the device may include a request receiving unit 601, a matching operation unit 602, and a template returning unit 603.

Request receiving unit 601 may be used for receiving a search request sent by a client for acquiring a photographing template, the request carrying number of subject characters and/or gender information;

Matching operation unit 602 may be used for performing a matching operation on the number of subject characters and/or gender information and the description information of each photographing template in the template database.

Template returning unit 603 may be used for returning a matched target photographing template to the client terminal, so that the client terminal provides photographing recommendation information according to the target photographing template.

According to embodiments of the present disclosure, a photographing template database may be established in advance for taking a group photo. The photographing template database may store a plurality of photographing templates respectively corresponding to different numbers of persons, gender, and the like. For example, the photographing template database may include a photographing template for taking a group photo of three girls, a photographing template for taking a group photo of two boys, and the like. Therefore, upon taking a group photo, a proper photographing template may be selected according to the number, gender, and the like of persons taking a group photo, and then a photo can be taken with reference to the positioning, angle and the like in the template, by which photographing effects may be improved.

It can be known from the description of the above embodiments that, it is appreciated that the present disclosure may be implemented by means of software and necessary universal hardware platforms. The technical solution of the present disclosure essentially or the part that contributes over the prior art may be embodied as a software product. The computer software product may be stored in a storage medium, such as ROM/RAM, magnetic diskettes, compact discs, and the like, including several instructions to cause a computer apparatus (e.g., a personal computer, a server, a network device, and the like) to execute the method described in various embodiments or some of the embodiments of the present disclosure.

Various embodiments in the specification are all described in a progressive manner, same or similar parts among various embodiments may be referred with each other. For example, as for the system or system embodiments, the description thereof are relatively simple because they are basically as similar as the method embodiments, and the relevance therebetween can refer to the description of the method embodiments. The system and system embodiments described above are merely illustrative. Units described as separate components may or may not be separated physically. And components described as units may or may not be physical units, for example, they can be located in one place or may be distributed on a plurality of network units. The objects of embodiments may be realized by selecting some or all modules according to actual needs. Those skilled in the art may understand and implement embodiments of the present disclosure without any inventive work.

The methods and devices for establishing a photographing template database and providing photographing recommendation information provided according to the present disclosure are introduced above in detail. Examples are described herein to illustrate the principles and implementations of the present disclosure. The description of the above embodiments is merely used for helping understand the methods and key concepts of the present disclosure. In the meantime, for a person skilled in the art, the particular implementation mode and application scope may be varied according to the concept of the present disclosure. In summary, the disclosure of the description shall not be construed as a limitation to the present disclosure.

What is claimed is:

1. A method for establishing a photographing template database, comprising:
    acquiring a picture as a photographing template according to a preset feature, wherein the preset feature includes character feature information of at least two characters included in the picture;
    acquiring description information of the photographing template;
    identifying a character feature profile curve in the photographing template;
    determining position information of the character feature profile curve in the photographing template;
    storing a corresponding relationship between the photographing template and the description information into the photographing template database; and
    storing the position information corresponding to the character feature profile curve into the template database,
    wherein after a search request for acquiring the photographing template is received,
        a matching operation is performed on the description information of the photographing template according to a parameter included in the search request,
        a matched photographing template is returned, and
        the position information corresponding to the character feature profile curve is returned.

2. The method according to claim 1, wherein the preset feature further comprises at least one of: background information, character feature profile sharpness, or position and proportion of character feature in the picture.

3. The method according to claim 1, further comprising:
    determining a name of a body part of the character feature and corresponding position information in the photographing template; and
    storing the name of the body part and the corresponding position information into the template database, wherein
    after a matched target photographing template is returned, the name of the body part and the corresponding position information are returned.

4. A method for providing photographing recommendation information, comprising:
    acquiring a number of subject characters and/or gender information;
    sending a request for acquiring a photographing template to a server, the request carrying the number of subject characters and/or gender information;
    receiving, from the server, a matched target photographing template that is based on the number of subject characters and/or gender information;
    receiving position information corresponding to a character feature profile curve included in the matched photographing template;
    initializing an image capture device;
    providing the character feature profile curve of a character feature in the matched target photographing template on an upper layer of an image captured by the image capture device; and
    providing photographing recommendation information to a user, according to the matched target photographing template returned by the server.

5. The method according to claim 4, wherein acquiring a number of subject characters and/or gender information comprises:
    determining the number of subject characters and/or gender information according to information input by the user.

6. The method according to claim 4, wherein acquiring a number of subject characters and/or gender information comprises:
    performing face recognition on an image captured by the image capture device; and
    determining the number of subject characters and/or gender information according to a number of recognized faces and recognized gender feature.

7. The method according to claim 4, further comprising:
    receiving a name of a body part of the character feature and position information corresponding to the body part;
    providing the name of the body part and the corresponding position information on the upper layer of the image.

8. The method according to claim 4, further comprising:
    performing face recognition on an image captured by the image capture device;
    determining a face form and/or body proportion of a subject character according to a result of the face recognition; and
    filtering the image captured by the image capture device according to the proportion, so as to adjust the face form and/or the body proportion of the subject character in the captured image.

9. The method according to claim 4, further comprising:
    receiving a selection of the matched target photographing template; and
    uploading identification information of the matched target photographing template—to the server, wherein the identification information is used to make statistics on a number of times that the photographing template has been selected.

10. A method for providing photographing recommendation information, comprising:
receiving a search request sent by a client terminal for acquiring a photographing template from a template database storing a plurality of photographing templates and corresponding description information, wherein the description information of the photographing template is associated with a number of characters and/or gender information included in the photographing template, the request includes a number of subject characters and/or gender information, and the template database stores a position information of a character feature profile curve identified in the plurality of photographing templates;
performing a matching operation on the number of subject characters and/or gender information and the description information of each of the photographing templates in the template database;
returning a matched target photographing template to the client terminal, wherein the matched target photographing template is used to provide a photographing recommendation information; and
returning a position information corresponding to a character feature profile curve identified in the matched target photographing template.

11. The method of claim 10, further comprising:
performing a matching operation on the number of subject characters and/or gender information and the description information for each of the photographing templates in the template database to acquire a matched target photographing template.

12. The method of claim 10, further comprising:
returning position information corresponding to a character feature profile curve contained in the matched target photographing template; and/or
returning a name of a body part of the character and position information corresponding to the body part.

13. A device for establishing a photographing template database, comprising:
a photographing template acquiring unit used for acquiring, as a photographing template, a picture according to a preset feature at least including character feature information of at least two characters contained in the picture;
a curve recognizing unit used for recognizing a character feature profile curve in the photographing template;
a position information determining unit used for determining position information of the character feature profile curve in the photographing template;
a curve information storing unit used for storing the position information corresponding to the character feature profile curve into the template database;
a description information acquiring unit used for acquiring description information of the photographing template according to number of characters and/or gender information contained in the photographing template; and
a corresponding relationship storing unit used for storing a corresponding relationship between the photographing template and the description information into the photographing template database,
wherein after a search request for acquiring a photographing template is received,
a matching operation is performed on the description information of the photographing template according to a parameter carried in the search request, and
a matched photographing template is returned; and
the position information corresponding to the character feature profile curve is returned.

14. The device according to claim 13, wherein the preset feature further comprises at least one of: background information, character feature profile sharpness, or position and proportion of character feature in the picture.

15. The device according to claim 13, further comprising:
a body part position information determining unit used for determining a name of a body part of the character feature and corresponding position information in the photographing template; and
a body part position information storing unit used for storing the name of the body part and the corresponding position information in the template database, wherein
after a matched target photographing template is returned, the name of the body part and the corresponding position information are returned.

16. A device for providing photographing recommendation information, comprising:
a subject character information acquiring unit used for acquiring a number of subject characters and/or gender information;
a request sending unit used for sending a request for acquiring a photographing template to a server and receiving, from the server, a matched target photographing template that is based on the number of subject characters and/or gender information, the request carrying the number of subject characters and/or gender information;
an image capture device initializing unit used for receiving position information corresponding to a character feature profile curve included in the matched photographing template and initializing an image capture device;
a body profile curve providing unit used for providing a body profile curve graph of a character feature in the matched target photographing template on an upper layer of an image captured by the image capture device; and
a recommendation information providing unit used for providing photographing recommendation information to a user according to the matched target photographing template returned by the server.

17. The device according to claim 16, wherein the subject character information acquiring unit is further used for determining the number of subject characters and/or gender information according to information input by the user.

18. The device according to claim 16, wherein the subject character information acquiring unit comprises:
an image capture device initializing sub-unit used for initializing an image capture device; and
a recognizing sub-unit used for performing face recognition on an image captured by the image capture device and determining the number of subject characters and/or gender information according to a number of recognized faces and gender feature.

19. The device according to claim 16, further comprising:
a body part position information providing unit used for receiving a name of a body part of the character feature and position information corresponding to the body part and providing the name of the body part and the corresponding position information on the upper layer of the image interface.

20. The device according to claim 16, further comprising:
a recognizing unit used for performing face recognition on an image captured by the image capture device;
a proportion information determining unit used for determining the face form and/or body proportion of each subject character according to results of the face recognition; and
a filtering unit used for filtering the image captured by the image capture device according to the proportion, so as to adjust the face form and/or the body proportion of each character in the captured picture.

21. The device according to claim 16, further comprising:
a template identification information uploading unit used for receiving a selection of the matched target photographing template and uploading identification information of the matched target photographing template to the server, wherein the identification information is used to make statistics on the number of times that the photographing template has been selected.

22. A device for providing photographing recommendation information, comprising:
a request receiving unit used for receiving a search request sent by a client terminal for acquiring a photographing template from a template database storing a plurality of photographing templates and corresponding description information, wherein the description information of the photographing template is associated with a number of characters and/or gender information included in the photographing template, the request includes a number of subject characters and/or gender information, and the template database stores a position information of a character feature profile curve identified in the plurality of photographing templates;
a matching operation unit used for performing a matching operation on the number of subject characters and/or gender information and the description information of each of the photographing templates in the template database;
a template returning unit used for returning a matched target photographing template to the client terminal, wherein the matched target photographing template is used to provide a photographing recommendation information and the position information corresponding to the character feature profile curve.

23. A non-transitory computer readable medium that stores a set of instructions that is executable by at least one processor of a device for establishing a photographing template database to cause the device to perform a method for establishing the photographing template database, the method comprising:
acquiring a picture as a photographing template according to a preset feature, wherein the preset feature includes character feature information of at least two characters included in the picture;
acquiring description information of the photographing template;
identifying a character feature profile curve in the photographing template;
determining position information of the character feature profile curve in the photographing template;
storing a corresponding relationship between the photographing template and the description information into the photographing template database; and
storing the position information corresponding to the character feature profile curve into the template database, wherein after a search request for acquiring the photographing template is received,
a matching operation is performed on the description information of the photographing template according to a parameter included in the search request,
a matched photographing template is returned, and
the position information corresponding to the character feature profile curve is returned.

24. The non-transitory computer readable medium according to claim 23, wherein the preset feature further comprises at least one of: background information, character feature profile sharpness, or position and proportion of character feature in the picture.

25. The non-transitory computer readable medium according to claim 23, wherein the set of instructions is executable by the at least one processor of the device to cause the device to further perform:
determining a name of a body part of the character feature and corresponding position information in the photographing template; and
storing the name of the body part and the corresponding position information into the template database, wherein
after a matched target photographing template is returned, the name of the body part and the corresponding position information are returned.

26. A non-transitory computer readable medium that stores a set of instructions that is executable by at least one processor of a client terminal to cause the client terminal to perform a method for providing photographing recommendation information, the method comprising:
acquiring a number of subject characters and/or gender information;
sending a request for acquiring a photographing template to a server, the request carrying the number of subject characters and/or gender information;
receiving, from the server, a matched target photographing template that is based on the number of subject characters and/or gender information;
receiving position information corresponding to a character feature profile curve included in the matched photographing template;
initializing an image capture device;
providing the character feature profile curve of a character feature in the matched target photographing template on an upper layer of an image captured by the image capture device; and
providing photographing recommendation information to a user, according to the matched target photographing template returned by the server.

27. The non-transitory computer readable medium according to claim 26, wherein the set of instructions is executable by the at least one processor of the client terminal to cause the client terminal to further perform acquiring a number of subject characters and/or gender information by:
determining the number of subject characters and/or gender information according to information input by the user.

28. The non-transitory computer readable medium according to claim 26, wherein the set of instructions is executable by the at least one processor of the client terminal to cause the client terminal to further perform acquiring a number of subject characters and/or gender information by:
performing face recognition on an image captured by the image capture device; and determining the number of subject characters and/or gender information according to a number of recognized faces and recognized gender feature.

29. The non-transitory computer readable medium according to claim 26, wherein the set of instructions is executable by the at least one processor of the client terminal to cause the client terminal to further perform:
  receiving a name of a body part of the character feature and position information corresponding to the body part; and
  providing the name of the body part and the corresponding position information on the upper layer of the image.

30. The non-transitory computer readable medium according to claim 26, wherein the set of instructions is executable by the at least one processor of the client terminal to cause the client terminal to further perform:
  performing face recognition on an image captured by the image capture device;
  determining a face form and/or body proportion of a subject character according to a result of the face recognition; and
  filtering the image captured by the image capture device according to the proportion, so as to adjust the face form and/or the body proportion of the subject character in the captured image.

31. The non-transitory computer readable medium according to claim 26, the set of instructions is executable by the at least one processor of the client terminal to cause the client terminal to further perform:
  receiving a selection of the matched target photographing template; and
  uploading identification information of the matched target photographing template to the server, wherein the identification information is used to make statistics on the number of times that the matched photographing template has been selected.

32. A non-transitory computer readable medium that stores a set of instructions that is executable by at least one processor of a server to cause the server to perform a method for providing photographing recommendation information, the method comprising:
  receiving a search request sent by a client terminal for acquiring a photographing template from a template database, wherein the template database stores a plurality of photographing templates and corresponding description information, the description information of the photographing template is associated with a number of characters and/or gender information included in the photographing template, the request includes a number of subject characters and/or gender information, and the template database stores a position information of a character feature profile curve identified in the plurality of photographing templates;
  performing a matching operation on the number of subject characters and/or gender information and the description information of each of the photographing templates in the template database;
  returning a matched target photographing template to the client terminal, wherein the matched target photographing template is used to provide a photographing recommendation information; and
  returning a position information corresponding to a character feature profile curve identified in the matched target photographing template.

* * * * *